United States Patent
Beier et al.

(10) Patent No.: US 6,280,115 B1
(45) Date of Patent: Aug. 28, 2001

(54) CONTROL SHAFT CARRYING A CONTROL ELEMENT AND METHOD FOR ITS MANUFACTURE

(75) Inventors: Alfred Beier, Braunschweig; Dietrich Distler, Wolfsburg, both of (DE)

(73) Assignee: Volkswagen AG (DE)

( * ) Notice: Subject to any disclaimer, the term of this patent is extended or adjusted under 35 U.S.C. 154(b) by 691 days.

(21) Appl. No.: 08/614,347

(22) Filed: Mar. 12, 1996

(30) Foreign Application Priority Data

Mar. 17, 1995 (DE) ............................................. 195 09 652

(51) Int. Cl.⁷ ....................................................... B25G 3/00
(52) U.S. Cl. ............................ 403/242; 403/282; 74/445; 29/509
(58) Field of Search ..................................... 403/242, 359, 403/298, 274, 279, 281, 282, 285; 74/445, 567; 29/509, 505

(56) References Cited

U.S. PATENT DOCUMENTS

| | | |
|---|---|---|
| 4,620,356 | 11/1986 | Maus et al. . |
| 4,630,498 | * 12/1986 | Santi ................................. 403/282 X |
| 4,809,562 | * 3/1989 | Bendoraitis et al. .................. 74/567 |
| 4,903,543 | * 2/1990 | Matt ................................. 403/282 X |
| 4,922,785 | * 5/1990 | Arnold et al. .......................... 74/567 |
| 5,272,930 | * 12/1993 | Nakamura et al. ................. 74/567 X |
| 5,307,708 | * 5/1994 | Matt ................................. 403/282 X |
| 5,419,217 | * 5/1995 | Umezawa et al. ................ 403/359 X |

FOREIGN PATENT DOCUMENTS

| | | |
|---|---|---|
| 2336241 | 7/1973 | (DE) . |
| 4121951 | 12/1992 | (DE) . |
| 4423107 | 1/1995 | (DE) . |
| 3717190 | 12/1998 | (DE) . |
| 178536 | 4/1986 | (EP) . |
| 291902 | 11/1988 | (EP) . |
| 0340128 | 11/1989 | (EP) . |
| 2707339 | 1/1995 | (FR) . |
| 1304143 | 1/1973 | (GB) . |
| 2001566 | 2/1979 | (GB) . |
| 2116675 | 9/1983 | (GB) . |
| 61129291 | * 6/1986 | (JP) . |

* cited by examiner

Primary Examiner—B. Dayoan
Assistant Examiner—William L. Miller
(74) Attorney, Agent, or Firm—Baker Botts LLP

(57) ABSTRACT

To secure a control element in the axial direction on a shaft member, the control element is pushed onto a region of the shaft member which has a slightly enlarged diameter, displacing shaft material in the process to form a burr on one side of the control element. Then a punch is pushed onto the enlarged diameter region to produce another burr by displacement of shaft material on the other side of the control element which is thus held axially on the shaft member in a positive manner in both directions. The control element is preferably formed from a multiplicity of layers of flat stock.

5 Claims, 1 Drawing Sheet

CONTROL SHAFT CARRYING A CONTROL ELEMENT AND METHOD FOR ITS MANUFACTURE

BACKGROUND OF THE INVENTION

This invention relates to control shafts to which control elements are affixed and to a method for manufacturing such control shafts.

German Offenlegungsschrift No. 37 17 190 discloses a camshaft for controlling valves in internal combustion engines in which the camshaft consists of a cylindrical shaft member onto which control elements in the form of cams are pushed so as to be connected rigidly to the shaft. In that case the cams are designed as one-piece sintered parts having an aperture which is provided with radial projections to receive the shaft. The shaft is formed with regions having a slightly larger diameter in certain areas, the axial extent of those regions corresponding to the width of the control cams. As the cams are pushed onto the regions of enlarged diameter, the radial projections in the aperture cut grooves along the enlarged region and the material displaced from the grooves is evidently lost. An extremely torsionally rigid connection is formed in this way between the cams and the shaft member.

That document also discloses a method for the manufacture of the above-mentioned camshaft in which a first enlarged shaft region is formed and, after a first cam has been mounted on that region, further regions of enlarged diameter are formed in succession and, after each enlarged diameter region is formed, another cam is pushed onto that region.

German Offenlegungsschrift No. 44 23 107 discloses the manufacture of cams, such as those for controlling the intake and exhaust valves of an internal combustion engine, from a multiplicity of layers of flat stock. For this purpose, a number of layers of stock are punched out of a steel sheet, for example a cold-rolled steel sheet, and then mounted together to form a cam assembly. In the punching operation, an aperture is formed in each layer to receive a shaft member when assembled and, at a distance from the resulting shaft aperture and parallel with the shaft axis, the cam assembly has an opening with a diameter which is significantly smaller than that of the shaft aperture. A pin formed with a collar and having a length which is greater than the width of the cam assembly is then inserted through smaller opening in the assembly. A washer is mounted on the projecting end of the pin and is welded to the pin on the side facing away from the cam. This arrangement of a pin and a washer-prevents the sheet assembly from falling apart but it does not prevent relative displacement between the adjacent layers of flat sheet stock about the longitudinal center line of the pin. This requires separate laser welds along two opposed grooves in the shaft aperture.

SUMMARY OF THE INVENTION

Accordingly, it is an object of the present invention to provide a control shaft carrying a control element and a method for its manufacture which overcome disadvantages of the prior art.

Another object of the invention is to provide a control shaft arranged so that the control elements, in addition to being fixed in a torsionally rigid manner on the shaft member, are also fixed in both axial directions on the shaft member.

A further object of the invention is to provide a method for the manufacture of such a control shaft which is as efficient and economical as possible.

These and other objects of the invention are attained by displacing shaft material to raise a burr on the shaft member so as to secure the control element axially on the shaft member. The burr can be raised from shaft member by upsetting, for example.

In a particularly advantageous and simple embodiment, the burr which secures the control element axially in one direction is formed by pushing the control element onto a region of enlarged diameter of the shaft member. An additional burr, which secures the control element in the other axial direction, is separately produced on the other side of the control element.

The first burr can be raised in a particularly successful manner if the control element for the aperture which receives the shaft member has an edge with a sufficiently sharp contour. This can be accomplished successfully using control elements which are sintered in one piece, for example, but those are expensive to produce.

In an advantageous embodiment of the invention, the control elements are formed from a multiplicity of layers of flat stock mounted axially adjacent to each other. These layers are punched out of correspondingly thin steel sheets, thereby producing sufficiently sharp edges at the shaft opening for the displacement of shaft material when pushed onto the shaft member. To hold the individual layers of stock together reliably and to avoid the necessity for separate welds, the control element has an opening which is spaced from the shaft member aperture and which has its axis parallel to that of the shaft aperture to receive a clamping element which passes through the entire control element and presses the individual layers of flat stock axially together.

The burr raised on the enlarged diameter shaft region by the pushing on of the control element can be made to form an encircling bead by providing a circular aperture in the control element. However, a particularly torsionally rigid connection can be achieved if the aperture has projections which extend radially inwardly so that, as the control element is pushed on the shaft member, grooves are cut into the enlarged diameter region and a number of burr accumulations corresponding to the number of grooves is formed in the process.

The additional burr on the other side of the control element is raised by displacement of shaft material in a comparable manner. For this purpose a punch having a circular burr-forming opening with a sufficient clearance, for example, is slipped over the shaft member and forced onto the enlarged diameter region, displacing shaft material against the control element in the process.

The control shaft according to the invention can be produced in a particularly advantageous manner by a method in which a first region with an enlarged diameter is made on the shaft member, this region having a greater axial length than the width of the first control element, and the first control element is forced onto this enlarged diameter region to displace shaft material and raise the first burr in order to secure the control element axially. The additional burr is then raised by pushing the punch onto the enlarged diameter region so that the control element is clamped axially between the two burrs. To raise this burr, the burr-forming opening in the punch has a diameter which is slightly smaller than that of the corresponding enlarged diameter region of the shaft member.

The above-mentioned method can advantageously be carried out in a manner which reduces the cost by forming the control elements using a multiplicity of identical layers of flat stock which are punched out with corresponding apertures to form the aperture which receives the shaft member. During this process, additional identical openings also are formed in each layer of the flat stock with their axis parallel to and spaced from the axis of the shaft apertures. The individual layers of flat stock are then mounted together in the same orientation automatically to form an assembly of the layers, the aligned individual layer openings providing a continuous opening in the assembly. A pin which has a stop at one end, such as for example, a rivet-type fastener, and which has an axial length greater than that of the opening, is inserted through the opening. By then upsetting the pin axially to form another stop at the other end and provide a clamping element, the assembly of layers is permanently held tightly together. The second stop can also be formed in some other way, for example by pressing a ring onto the pin.

This arrangement prevents twisting of the individual layers relative to each other about the longitudinal center line of the clamping element.

The invention is not restricted to the exemplary embodiment described below. The control shaft can, for example, be a camshaft for controlling intake and exhaust valves of an internal combustion engine with the control elements in the form of cams. In a similar configuration, a control shaft of this kind can be used for a fuel injection pump. Moreover, the control elements can, for example, be designed as eccentrics, the control shaft according to the invention being usable in a large number of machines of different types.

BRIEF DESCRIPTION OF THE DRAWINGS

Further objects and advantages of the invention will be apparent from a reading of the following description in conjunction with the accompanying drawings in which.

DESCRIPTION OF PREFERRED EMBODIMENTS

In the following description an exemplary embodiment constitutes a control shaft in the form of a camshaft for an internal combustion engine in which the control elements are cams providing for the periodic actuation of intake and exhaust valves.

Figure 1:
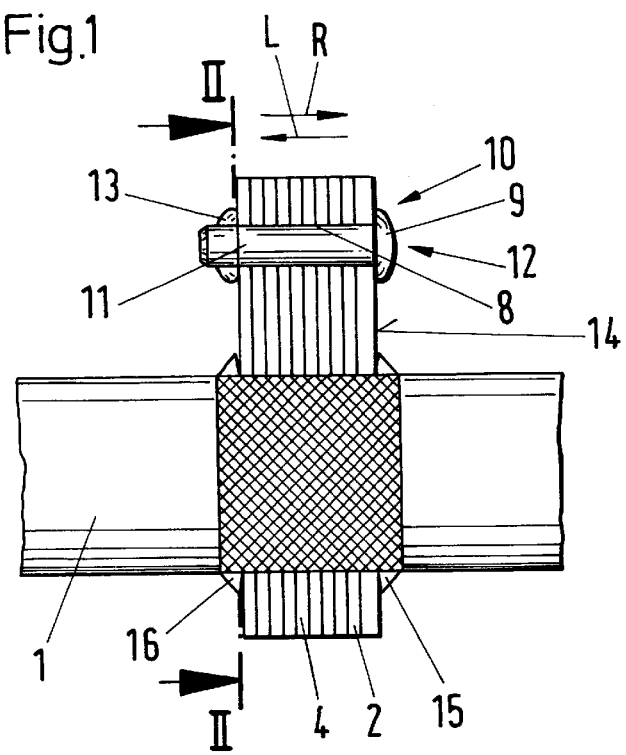
FIG. 1 is a schematic side sectional view illustrating part of a control shaft with a control element mounted on the shaft according to the invention.
Figure 2:
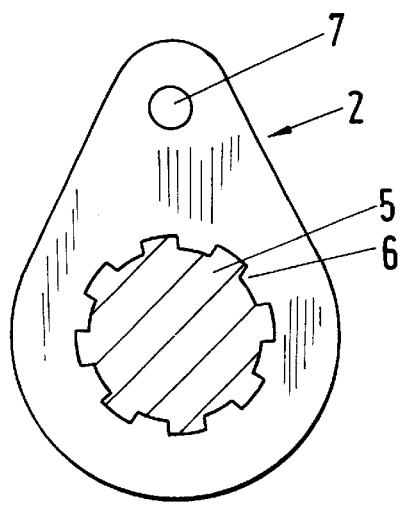
FIG. 2 is a sectional view taken along the line II—II of FIG. 1.

As shown in FIGS. 1 and 2 a control shaft includes a shaft member 1 onto which control elements 2 are pushed. The shaft member 1 has a cam mounting region 3, which may be, for example, a knurled portion, on which the control element 2 is mounted. The diameter D of the cam mounting region 3 is slightly larger than the diameter d of the shaft member 1 and the axial length of that region is greater than the width of the control element 2.

Although for convenience only one mounting region 3 and one control element 2 are shown in the drawings it will be understood that a control shaft according to the invention will usually have a plurality of mounting regions 3 and corresponding control elements 2 in spaced relation on the same shaft member 1.

Each control element 2 to be mounted on the shaft member 1 is formed from a multiplicity of identical layers 4 of flat stock, comprising what are known as laminated-sheet cams as described, for example, in German Offenlegungsschrift No. 44 23 107.

Figure 3:
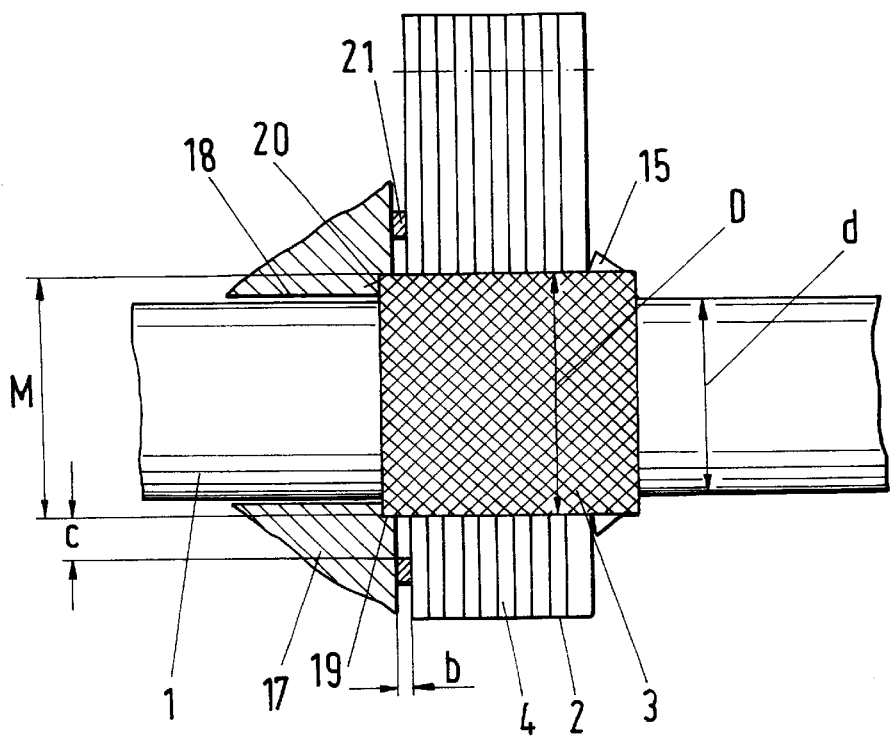
FIG. 3 is a schematic side sectional view similar to that of FIG. 1 to illustrate a process for the production of the control shaft of FIG. 1.

The number of layers 4 in each control element 2 can be significantly greater than the comparatively small number which is shown in FIGS. 1 and 3 for the purpose of clarity. The individual layers 4 are punched out of a steel sheet and each has an aperture 5 with radially inwardly-directed projections 6 and an opening 7 spaced from the aperture 5 with its axis parallel to that of the aperture. After the identical layers 4 have been punched out, approximately 60 such layers 4, for example, are joined together automatically in identical orientations to form an assembly of layers with a continuous opening 8 through the assembly produced by the aligned individual openings 7. A shank 11 of a rivet 12 is then pushed through the opening 8, the pin being formed with a stop 9 at one end and its axial length being greater than the width of the control element 2. A further stop 13 is then formed on the opposite side by upsetting the pin 11 axially so as to form a clamping element 10. In the process, the laminated assembly situated between the stops 9 and 13 is compressed axially in the manner usual in riveting.

After a first enlarged diameter region 3 has been formed on the shaft member 1, a first control element 2 is pushed onto this region. Since the distance between opposed projections 6 in the shaft aperture is smaller than the diameter D of the enlarged diameter region 3, grooves are formed by displacement of the shaft material when the control element 2 is pushed onto that region. This material is pushed ahead of the leading face 14 of the control element 2 and remains as a raised burr 15 on the region 3 after the control element has been pushed into place. The control element is thereby fixed axially in one direction R of the control shaft as shown in FIG. 1.

After one burr 15 has been formed in this manner, another burr 16, which secures the control element axially on the control shaft in the opposite axial direction L as shown in FIG. 1, is produced by displacing shaft material from the region 3 toward the control element with a punch 17 as shown in FIG. 3.

The punch 17 has a central hole 18 which surrounds the shaft member 1 with a clearance. At the end facing the control element 2, the hole 18 increases in size in a stepped manner to form an opening 19 which has a diameter M slightly smaller than the diameter D of the enlarged diameter region 3.

As shown in FIG. 3 a step 20 between the opening 19 and the hole 18 defines a stop for the punch 17 terminates the formation of the second burr 16, the burr 16 being shown in FIG. 1 but not in FIG. 3.

After the second burr 16 is formed, the punch 17 is retracted and another enlarged diameter region 3 is made at another location on the shaft member 1 and another control element 2 is then mounted on that region in an identical manner.

To shorten the process and simplify the manufacture, each control element 2 can be pushed onto the corresponding enlarged diameter region by the punch 17. For this purpose, each control element 2 is held on the punch 17 by a distance piece 21 as shown in FIG. 3. The width b of the distance piece 21 is at least as great as the width of the additional burr 16 which is raised by the opening 19 in the punch. The distance piece 21, which can be formed in one piece with the punch 17, has a radial clearance c from the enlarged diameter portion 3 so as to permit formation of the burr 16.

The control shaft described above can be made by machine in an extremely efficient manner. The individual layers of flat stock can be punched with high dimensional accuracy out of thin steel sheets in such a way that no burr is formed at the punched edges to impede flush assembly. The layers of stock, which are then disposed in aligned relation to form an assembly, can be held together axially by a simple, commercially available rivet which acts as a clamping element. The control element 2 can be pushed on the enlarged portion 3 of the shaft member 1, by the punch 17 for one burr 15 and in the same operation the punch forms the other burr 16, the control element 2 thereby being fixed axially in both directions L and R in a positive manner. A torsionally rigid connection between the control element 2 and the shaft member 1 is ensured by engagement of the teeth formed by the projections 6 in the shaft member.

The shaft member 1 does not have to be a solid member, nor does it have to constitute the camshaft as such. The shaft member 1 can, for example, be a hollow cylindrical sleeve on which one or more control elements 2 are arranged to provide a subassembly. This subassembly may then be supported on a camshaft, for example, in such a way as to permit relative angular motion between the camshaft and the subassembly containing the control elements. Moreover, the control elements do not necessarily have to be mounted on the sleeve with the same angular orientation.

Although the invention has been described herein with reference to specific embodiments, many modifications and variations therein will readily occur to those skilled in the art. Accordingly, all such variations and modifications are included within the intended scope of the invention.

We claim:

1. A control shaft arrangement comprising a shaft member and at least one control element having an aperture which receives the shaft member and being connected rigidly to the shaft member, and at least one burr raised on the shaft member by displacement of shaft material so as to affix the control element axially to the shaft member in a positive manner.

2. A control shaft arrangement according to claim 1 wherein the shaft member has a region of enlarged diameter on which the control element is mounted and on which a first burr is raised by the pushing the control element onto the enlarged diameter region and on which a separately produced second burr is formed.

3. A control shaft arrangement according to claim 2 wherein the control element comprises a multiplicity of layers of flat stock which are assembled axially adjacent to each other and having an opening in the layers of flat stock extending parallel to and spaced from the aperture which receives the shaft member, and a clamping element extending through the opening and pressing the layers of flat stock together.

4. A control shaft arrangement according to claim 3 wherein the aperture in the control element has radial projections which form the first burr.

5. A control shaft arrangement according to claim 4 wherein the second burr is formed by a punch having a burr-forming opening of circular configuration which is pushed onto the region of enlarged diameter of the shaft member.

* * * * *